(12) United States Patent
Pastelak

(10) Patent No.: US 8,220,747 B2
(45) Date of Patent: Jul. 17, 2012

(54) SYSTEM AND METHOD FOR A FUEL BLADDER ASSEMBLY WITH INTERNAL NETTING

(75) Inventor: Michael Pastelak, New Freedom, PA (US); Bonnie Lee Pastelak, legal representative, New Freedom, PA (US)

(73) Assignee: AAI Corporation, Hunt Valley, MD (US)

( * ) Notice: Subject to any disclaimer, the term of this patent is extended or adjusted under 35 U.S.C. 154(b) by 322 days.

(21) Appl. No.: 12/622,137

(22) Filed: Nov. 19, 2009

(65) Prior Publication Data

US 2010/0163680 A1    Jul. 1, 2010

Related U.S. Application Data

(60) Provisional application No. 61/117,675, filed on Nov. 25, 2008.

(51) Int. Cl.
*B64D 37/02* (2006.01)
(52) U.S. Cl. .................. 244/135 B; 244/135 R; 141/110
(58) Field of Classification Search ............... 244/135 A, 244/135 R
See application file for complete search history.

(56) References Cited

U.S. PATENT DOCUMENTS

| | | | | |
|---|---|---|---|---|
| 2,609,118 A | * | 9/1952 | Cattaneo | 220/723 |
| 2,719,583 A | * | 10/1955 | Malick | 137/210 |
| 3,826,372 A | * | 7/1974 | Bell | 210/172.4 |
| 4,369,938 A | * | 1/1983 | Kress | 244/135 R |
| 7,341,222 B1 | * | 3/2008 | Reuel et al. | 244/11 |
| 7,478,729 B2 | | 1/2009 | Sato et al. | |
| 8,011,620 B2 | * | 9/2011 | Guptaa et al. | 244/135 B |
| 2003/0052222 A1 | * | 3/2003 | Plump et al. | 244/23 A |
| 2008/0318105 A1 | * | 12/2008 | Burling et al. | 429/30 |
| 2010/0102164 A1 | | 4/2010 | Brutoco | |

OTHER PUBLICATIONS

Office Action for U.S. Appl. No. 12/622,177 mailed on Dec. 7, 2011.
Office Action for U.S. Appl. No. 12/622,159 mailed on Dec. 8, 2011.

* cited by examiner

*Primary Examiner* — Joshua J Michener
*Assistant Examiner* — Medhat Badawi
(74) *Attorney, Agent, or Firm* — Venable LLP; Jeffri A. Kaminski; Todd R. Farnsworth

(57) ABSTRACT

Systems and methods provide for a flexible fuel bladder assembly disposed to store fuel and supply the fuel to a vehicle. The flexible fuel bladder assembly may include: a fuel bladder including a fuel-resistant film disposed to store the fuel and supply the fuel therefrom at a manifold assembly connected thereto; and a netting disposed within the fuel bladder and disposed to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder. The flexible fuel bladder may be used in an unmanned aerial vehicle (UAV), which may be any one of: an organic air vehicle (OAV), a micro air vehicle (MAV), an unmanned ground vehicle (UGV) or an unmanned combat air vehicle (UCAV).

22 Claims, 17 Drawing Sheets

SYSTEM AND METHOD FOR A FUEL BLADDER ASSEMBLY WITH INTERNAL NETTING

CROSS-REFERENCE TO RELATED APPLICATIONS

This patent application claims priority to U.S. Provisional Patent Application No. 61/117,675, filed on Nov. 25, 2008, and U.S. patent application Ser. Nos. 11/984,387 and 11/984, 396, filed Nov. 16, 2007, which in turn claim priority to U.S. Provisional Patent Application No. 60/859,243, filed Nov. 16, 2006. The foregoing applications are incorporated herein by reference in their respective entireties.

BACKGROUND

1. Field

Exemplary embodiments relate generally to unmanned vehicles, and more particularly to fueling systems for unmanned vehicles.

2. Related Art

A number of Unmanned Air Vehicle (UAV) have come to be used in modern times, which refer to aircrafts flown without a pilot. A number of different UAVs have grown in modern times. Exemplary types of UAVs offered by the UAV industry may include organic air vehicles (OAVs), micro air vehicles (MAVs), unmanned ground vehicles (UGVs) and unmanned combat air vehicles (UCAVs). The present embodiments are described in reference to an MAV, though as noted, the present embodiments may be applied to any type of UAV.

For example, an exemplary MAV may comprise a small (for example, 13-inch) vehicle for autonomous surveillance. The MAV may be small enough for a foot soldier to carry on his or her back and is designed to provide the soldier with improved situational awareness without exposing him or her to enemy fire through, for example, forward- and downward-looking video cameras that relay information to a remote ground station video terminal. Such an exemplary MAV may be used for security, reconnaissance and target acquisition in open, rolling, complex and urban terrain.

UAVs, including MAVs, include fuel pickup systems, which may include one or more internal fuel tanks. The relatively small size, unmanned operation, and physical mechanics of smaller unmanned vehicles such as MAVs make engine stalls and/or failures, and therefore, undesired catastrophic events an unfortunate reality. There must be a continuous flow of fuel from the fuel tank to the engine to prohibit such engine stalls and/or failures. Unfortunately, the operation of the vehicle results in folding, turning, kinking and swelling of the flexible materials employed in current designs for fuel tanks. As a result, the run time of the engine may be unduly shortened, and a catastrophic failure of the aircraft may occur. What is required is to improve the state of the technology by solving these problems.

SUMMARY

Systems and methods provide for a flexible fuel bladder assembly disposed to store fuel and supply the fuel to a vehicle. The flexible fuel bladder assembly may include: a fuel bladder including a fuel-resistant film disposed to store the fuel and supply the fuel therefrom at a manifold assembly connected thereto; and a netting disposed within the fuel bladder and disposed to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

In an exemplary embodiment, the flexible fuel bladder may be used in an unmanned aerial vehicle (UAV), which may be any one of: an organic air vehicle (OAV), a micro air vehicle (MAV), an unmanned ground vehicle (UGV) or an unmanned combat air vehicle (UCAV).

In an exemplary embodiment, the fuel bladder is comprised of a flexible material. The fuel bladder may comprise a thermoplastic film. The thermoplastic film may have been heat sealed along at least one of its edges to enclose the fuel bladder.

In an exemplary embodiment, at least a portion of the manifold assembly is disposed within the fuel bladder. The manifold assembly may include any one of: an o-ring; and a washer and threaded barb fitting. The assembly may further include a flexible tube fixedly connected to the manifold assembly. The flexible tube may supply fuel from the fuel bladder to the manifold assembly including an intake manifold of an engine of the vehicle.

In an exemplary embodiment, the netting may be comprised of a resin material. The resin material may be generated by a vacuum assisted resin transfer molting (VARTM) method.

In an exemplary embodiment, an unmanned aerial vehicle (UAV) is provided, which includes: an engine component; a fan duct assembly comprising a shell structure disposed to hold a flexible fuel bladder assembly and one or more struts. The flexible fuel bladder assembly may be disposed to store fuel and supply the fuel to the engine component. The flexible fuel bladder assembly may include: a fuel bladder including a fuel-resistant film disposed to store the fuel and supply the fuel therefrom at a manifold assembly of the engine component connected thereto; and a netting disposed within the fuel bladder and disposed to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

In an exemplary embodiment, the unmanned aerial vehicle (UAV) is a micro air vehicle (MAV). In an exemplary embodiment, the unmanned aerial vehicle (UAV) is any one of: an organic air vehicle (OAV), an unmanned ground vehicle (UGV) or an unmanned combat air vehicle (UCAV).

In an exemplary embodiment, the fuel bladder is comprised of a thermoplastic film. The thermoplastic film may have been heat sealed along at least one of its edges to enclose the fuel bladder.

In an exemplary embodiment, the manifold assembly includes any one of: an o-ring; and a washer and threaded barb fitting. Also, the netting may be comprised of a resin material.

In an exemplary embodiment, a method is provided for producing a flexible fuel bladder assembly disposed to store fuel and supply the fuel to a vehicle. The method may include: producing a fuel bladder from a fuel-resistant film to store the fuel and supply the fuel therefrom at a manifold assembly connected thereto; and disposing a netting within the fuel bladder to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

Further features and advantages of, as well as the structure and operation of, various embodiments, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EMBODIMENTS OF THE EMBODIMENTS

Figure 1:
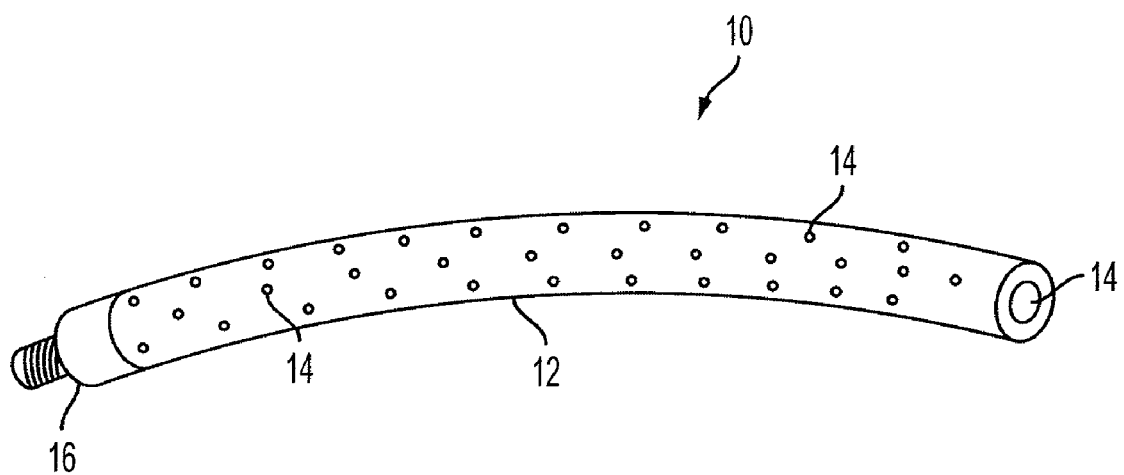
FIG. 1 is a perspective view of an exemplary fuel pickup.

Various exemplary embodiments are discussed in detail below including a preferred embodiment. While specific implementations are discussed, it should be understood that this is done for illustration purposes only. A person skilled in the relevant art can recognize that the systems, methods and features provided herein may be used without parting from the spirit and scope of the invention. Furthermore, any and all references cited herein shall be incorporated herein by reference in their respective entireties.

Exemplary Embodiments

In recent times, the term Unmanned Air Vehicle (UAV) generally refers to any aircraft flown without a pilot. Alternative designations for UAVs have included such terms as remotely-piloted vehicles (RPV), remotely-operated vehicles (ROV), drones, robot planes or pilot-less aircraft, though the designations may be even broader than UAV, which refers only to aircraft, as ROV and RPV may even refer to submarines, ground vehicles and other types of moving vehicles.

Though designated UAVs, these vehicles may be defined by the United States Department of Defense as powered aerial vehicles which do not carry human operators, may use aerodynamic forces for vehicle lift, may fly autonomously or with remote piloting, may be expendable/recoverable, and may carry a lethal or non-lethal payloads. The present embodiments may apply to any of the foregoing vehicles.

A number of different UAVs have grown in modern times, though the present embodiments may apply to any type of UAV, or for that matter, any type of unmanned or partially unmanned vehicle. Exemplary types of UAVs offered by the UAV industry may include organic air vehicles (OAVs), micro air vehicles (MAVs), unmanned ground vehicles (UGVs) and unmanned combat air vehicles (UCAVs). The present embodiments are described in reference to an MAV, though as noted, the present embodiments may be applied to any type of UAV.

In an exemplary embodiment, an exemplary MAV for use with the present embodiments include a small (for example, 13-inch) MAV providing technology offered by Honeywell and/or AAI Corp. for autonomous surveillance. An exemplary such MAV may be small enough for a foot soldier to carry on his or her back and is designed to provide the soldier with improved situational awareness without exposing him or her to enemy fire through, for example, forward- and downward-looking video cameras that relay information to a remote ground station video terminal. Such an exemplary MAV may be used for security, reconnaissance and target acquisition in open, rolling, complex and urban terrain.

UAVs and the above noted aircraft may include a fuel system that includes a fuel bladder for holding fuel. In an exemplary UAV, the fuel bladder may be located, for example, within the hollow wings of the UAV. In an exemplary MAV type of UAV, for example, the fuel bladder may be included within the structure of the device, as further illustrated below.

In an exemplary embodiment, the fuel system may include one or more fuel pickups located within the bladder. The fuel pickup may transport the fuel inside the bladder to transfer lines located outside of the bladder. The transfer lines transfer the fuel to downstream components, such as a fuel pump or fuel filter, and the fuel is ultimately delivered to an engine.

As the engine consumes the fuel contained in the fuel bladder, the air/fuel ratio inside the bladder increases. As the air/fuel ratio reaches high levels (e.g., greater than 1:1), the chances of air or fuel vapor ingestion increases. Vaporized fuel in the system can result, for example, from vaporized fuel present in a closed fuel system. In an exemplary embodiment, air can enter the fuel system, for example, due to improper fueling procedures, or leaking fuel line connections or fittings.

When the engine ingests air or fuel vapor, a failure such as a stall may occur. For example, with conventional fuel pickups, the engine may stalls due to air and/or fuel vapor ingestion prior to consumption of all of the fuel contained in the fuel bladder. As a result, the run time of the engine may be unduly shortened, and a catastrophic failure of the aircraft may occur.

Closed, meaning unvented fuel systems, conventionally rely on the integrity of the vacuum created and maintained within sealed containers or collapsible bladders to prevent the intrusion of air and/or vapor into the system. In an exemplary embodiment, such systems generally may not provide countermeasures to remove internally generated fuel vapor and/or air that enters due to improper fueling or leaks. Accordingly, the total volume of air and/or fuel vapor inside the various components (e.g., fuel bladders, tanks, lines, etc.) of a closed system may reach critical levels capable of progressing through the fuel lines into the engine and thereby inducing engine-seizure.

Open, meaning vented fuel systems, may incorporate a mechanism that allows the removal of undesirable air or fuel-vapor from the fuel lines. Such mechanisms, however, may be independent from the system fuel sump and not electronically controlled or modulated based on system conditions. Furthermore, the mechanism may not typically be located immediately before the engine and significant distance between the mechanism and the engine can allow for the intrusion of air through leaks or poorly sealed connections, or additional fuel vapor generated in the lines subsequent to the mechanism, thereby obviating the advantages of an open system.

Referring to FIG. 1, an exemplary fuel bladder or fuel pickup tube is shown generally as reference number 10. Fuel pickup tube 10 may be of the type typically referred to in the art as a "piccolo tube," although other configurations are possible.

As shown in FIG. 1, fuel pickup tube 10 can comprise an elongated section of tubing 12 including one or more openings 14 for taking up fuel, for example, from a fuel container. The openings 14 may be of various shapes and sizes, and may be located along the length of the tubing 12, as well as at the terminal end of the tubing 12.

As also shown in FIG. 1, fuel pickup tube 10 can include a fitting 16 located at one end, for example, a threaded connector or a quick-connector. Fitting 16 can connect fuel pickup tube 10 to downstream hoses, etc., to facilitate fuel delivery, for example, to an aircraft engine. According to an exemplary embodiment, fuel pickup tube 10 may include a RQ-7B piccolo tube having a length of approximately 35 inches, an outer diameter of approximately ⅛ to ½ inches, and holes spaced approximately 2 to 3 inches apart, although other configurations are possible.

As discussed in more detail below, pickup tube 10 can be located within a fuel container 50 that may be located, for example, in the wing of an aircraft, such as a UAV. Fuel pickup tube 10 is not limited to the circular and/or oval cross-sectional shape and configuration shown. For example, fuel pickup tube 10 can alternatively have a square, triangular, polygonal or other cross-section. Additionally or alternatively, fuel pickup tube 10 can be curved or bent. Fuel pickup tube 10 can be flexible or rigid. A number of embodiments are provided herein.

Figure 2A:
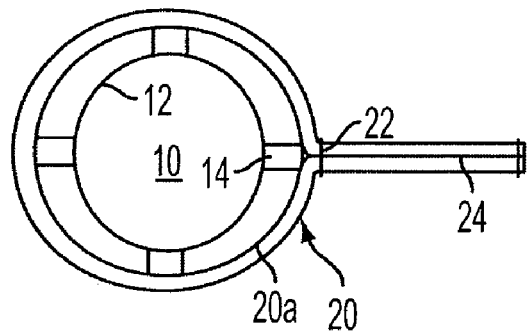
FIGS. 2A-2C depict exemplary embodiments of a fuel pickup tube wrapped in a wicking material, shown schematically and in cross-section.
Figure 2B:
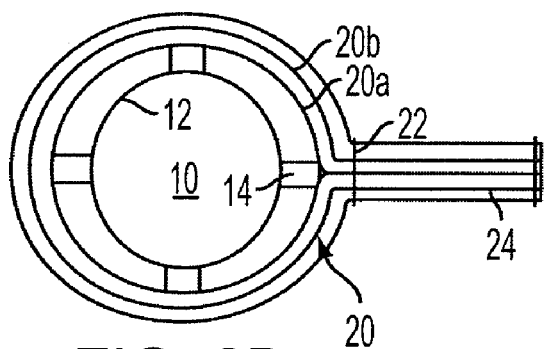
Figure 2C:
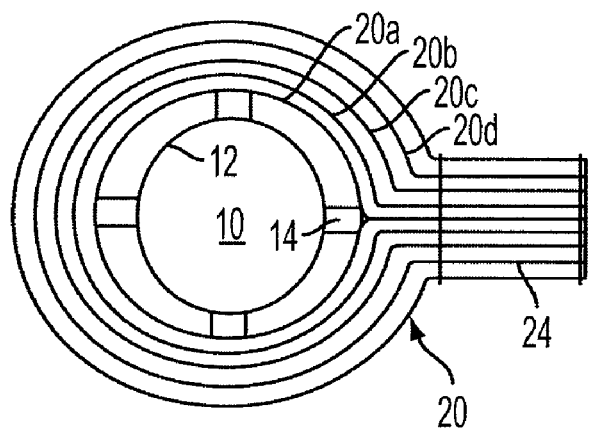
Figure 3:
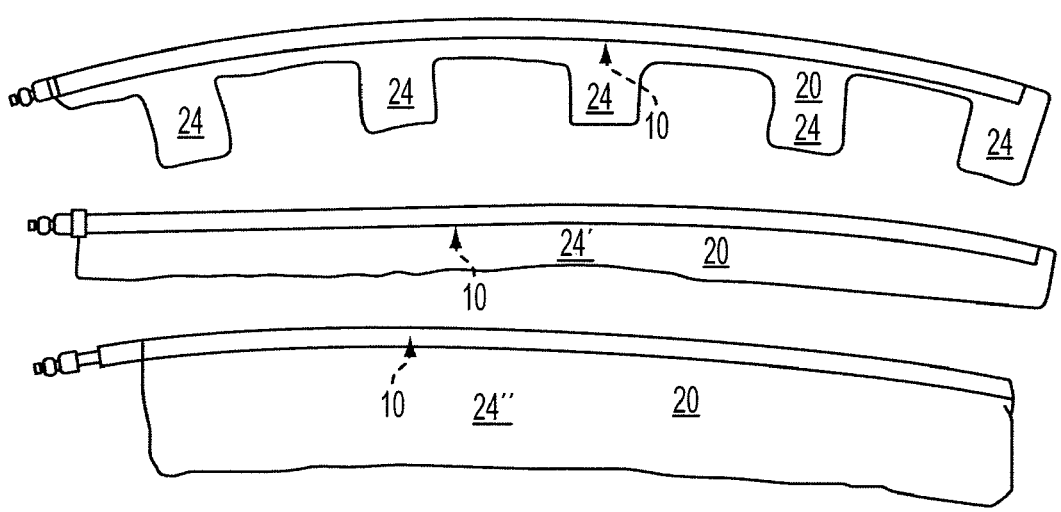
FIG. 3 is a top view of three exemplary embodiments of a fuel pickup tube wrapped in a wicking material.
Figure 4:
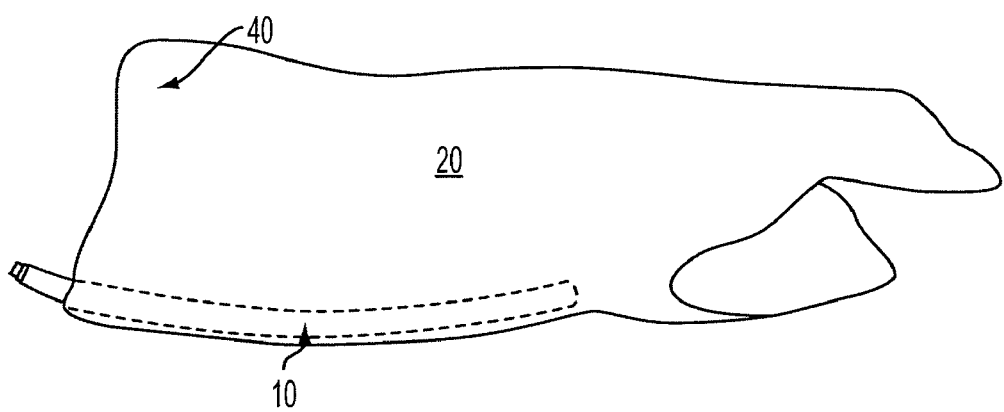
FIG. 4 is a perspective view of an exemplary embodiment of a fuel pickup tube attached to a wicking material.

Referring generally to FIGS. 2-4, a wicking material 20 can be associated with fuel pickup tube 10, for example, to increase the amount of fuel that can be reliably drawn up by an engine connected to the fuel pickup tube 10 prior to engine seizure or fuel starvation. The fuel pickup tube 10 can exploit the capillary transport abilities of the wicking material 20 (e.g., both in static equilibrium and across a pressure gradient), to increase the fuel uptake. Exemplary materials suitable for the wicking material 20 include materials that wick liquids against a gravity potential when standing upright. This capillary wicking capacity allows the materials to exploit a pressure gradient across their surface to enhance the delivery of fuel to downstream fuel transfer lines.

According to an exemplary embodiment, the wicking material 20 may have a vinyl composition, and/or can have a microporous molecular structure. The microporous molecular structure can act as conduits to take up fuel across substantially the entire area of the wicking material 20, thereby expanding the accessible fuel region with a fuel container to nearly any location the wicking material 20 contacts. According to an exemplary embodiment, the wicking material 20 may include a saran-based fabric such as, for example, but not limited to, NF-900 Saran-Fabric from Asahi-Kasei America Inc., of New York, N.Y., USA.

Referring to the exemplary embodiments of FIGS. 2A-2C, exemplary wicking material 20 may be wrapped tightly around the tubular portion 12 of fuel pickup tube 10, for example, such that the wicking material 20 may conform closely to the outer circumference of the tubular portion 12.

As shown in the exemplary embodiment of FIG. 2A, a single layer 20a of the wicking material 20 may be wrapped completely around the tubular portion 12, and joined together, for example, with stitches 22 or other fastening structures known in the art.

Alternatively, layer 20a can comprise a unitary, tube-shaped piece of the wicking material 20 that is slid over the tubular portion 12 of the fuel pickup tube 10. FIG. 2B is similar to the embodiment of FIG. 2A, except that it may include two layers 20a, 20b of wicking material 20 wrapped tightly around the fuel pickup tube.

FIG. 2C is also similar to the embodiment of FIG. 2A, except that it includes four layers 20a, 20b, 20c, 20d of wicking material 20 wrapped tightly around the fuel pickup tube. Layering the wicking material can increase the amount of wetted surface area exposed to fuel, for example, during flight, and can increase the fuel retention and wicking potential of the wicking material 20.

As a result, layering the wicking material 20 can increase the fuel uptake properties of the fuel pickup tube 10. Based on the specific configuration of the wicking material 20, and its weight, it is expected that the wicking material may add between about 0.2 and about 1.0 pounds to the weight of a fuel system according to an exemplary embodiment.

Again referring to FIGS. 2A-C, the one or more layers of wicking material 20 can envelope each of the holes 14 in the tubular portion 12 of the fuel pickup tube, including the hole 14 located in the terminal end of portion 12. For example, as shown, the wicking material 20 can be held tightly over each of the holes 14, such that the wicking material may completely cover each of the holes 14 in a flush manner.

As a result, any pressure gradient applied to the fuel pickup tube can create a pressure-gradient across the one or more layers of wicking material 20, thereby maximizing the amount of fuel available to the fuel pickup tube 10 by drawing through each of the one or more layers of wicking material 20. Therefore, the wicking material 20 may prevent vapor or air ingestion into an engine and may mitigate fuel system related mishaps.

Additional benefits can include water/fuel separation and/or in-tank fuel filtration. The fuel pickup tube 10 and wicking material 20 can be used with closed-loop fuel systems, and/or electronic fuel injection systems (e.g., to provide air- and vapor-free fuel delivery to injectors). According to an exemplary embodiment, the wicking material 20 and/or fuel pickup tube 10 can be retrofitted to existing fuel systems without substantially affecting their configuration and/or operation. For example, a conventional fuel bladder and fuel pickup may be replaced with one described herein. Alternatively, an entire wing containing a system may be replaced with a wing containing a fuel system described herein.

The wicking material 20 may include one or more tabs 24 extending along the length of the tubular portion 12 of the fuel pickup tube 10. The tab(s) 24 may comprise a single layer of material folded over on itself, as shown in FIG. 2A, or alternatively, can comprise multiple layers of material folded over upon themselves, as shown in FIGS. 2B and 2C.

The tab(s) 24 can extend away from the tubular portion 12 in a radial direction, as shown. The tab(s) 24 can be formed integrally with the one or more layers of wicking material 20, as shown in FIGS. 2A-C, or alternatively, can comprise separate pieces of material attached, for example, by sewing. The tab(s) 24 can act as outward extensions of the wicking material 20 that increase the reach and/or fuel-retention of the wicking material 20 during flight maneuvers, for example, where fuel location is subject to change.

FIG. 3 provides three exemplary configurations of tab(s) 24 shown in top view. The exemplary embodiment at the top of FIG. 3 may include four intermittent tabs 24 extending along the length of the tubular portion 12 of the fuel pickup tube 10.

The tabs 24 may be generally evenly spaced apart, and have open spaces located between adjacent tabs 24. The tabbed configuration may allow for wicking of fuel from substantially the entire bladder, while at the same time reducing the volume and weight of the wicking material 20.

In an exemplary embodiment, reducing the volume of the wicking material 20 may allow for more fuel to be contained in the bladder. Reducing the weight of the wicking material 20 may reduce the overall weight of the fuel system or aircraft.

According to an exemplary embodiment, the tabs 24 are approximately two inches wide, extend approximately three inches away from the tubular portion in the radial direction, and are spaced approximately four inches apart from one another. The wicking material 20 in the embodiment at the top of FIG. 3 includes two layers 20a, 20b of wicking material 20 (see FIG. 2B), however, other configurations are possible.

The exemplary embodiments of fuel pickups shown at the middle and bottom of FIG. 3 each may include a single, uninterrupted tab 24', 24", respectively, that may extend along the length of the tubular portion 12. The embodiment in the middle of FIG. 3 may include a relatively thin tab 24' of wicking material 20 (e.g., 1 to 2" across). The embodiment in the middle of FIG. 3 may also include four layers 20-20d of wicking material 20 (see FIG. 2C), although other configurations are possible. The configuration at the bottom of FIG. 3 may include a relatively wide tab 24" (e.g., 4" across) and includes a single layer 20a of wicking material 20 (see FIG. 2A), although other configurations are possible. In all three exemplary embodiments shown in FIG. 3, the wicking material 20 may cover the entire length of the tubular portion 12 of fuel pickup tube 10, including the hole 14 located at the terminal end of tubular portion 12.

FIG. 4 illustrates yet another exemplary embodiment of the wicking material 20. According to this embodiment, one or more layers of the wicking material 20 may be formed into a bag 40, and all or part of the tubular portion 20 of the fuel pickup tube 10 may extend into the bag 40, for example, through an appropriately shaped hole in the wicking material 20.

Here, a portion of the wicking material 20 may be wrapped tightly around all or a part of the tubular portion 12, for example, similar to the exemplary embodiments of FIGS. 2 and 3. Alternatively, all or a portion of the tubular portion 12 may be positioned freely within the bag 40, i.e., versus rigidly connected to the wicking material.

According to another exemplary embodiment, the wicking material 20 may be used in place of the tubular portion 12. For example, a truncated tubular portion 12 may abut the bag 40 at its perimeter (e.g., along an edge), and extend only slightly into the bag 40, for example, by approximately ½ to 2 inches, or alternatively, not extend into the bag 40 at all.

Figure 5:
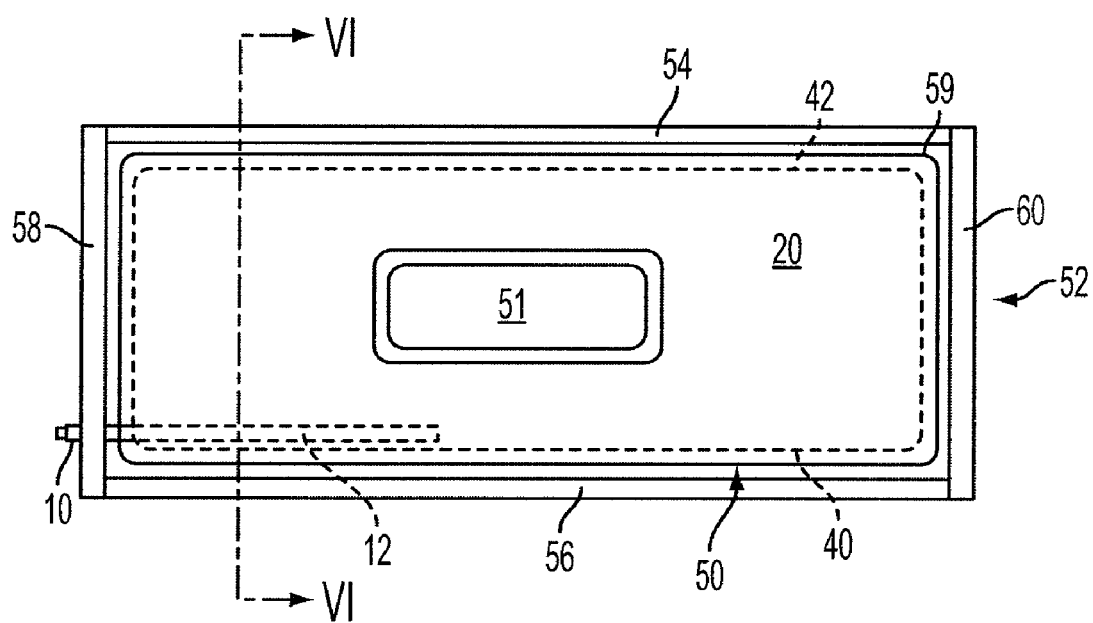
FIG. 5 is a top, schematic representation of an exemplary aircraft wing enclosing a fuel bladder in conjunction with a fuel pickup tube and wicking material.
Figure 6:
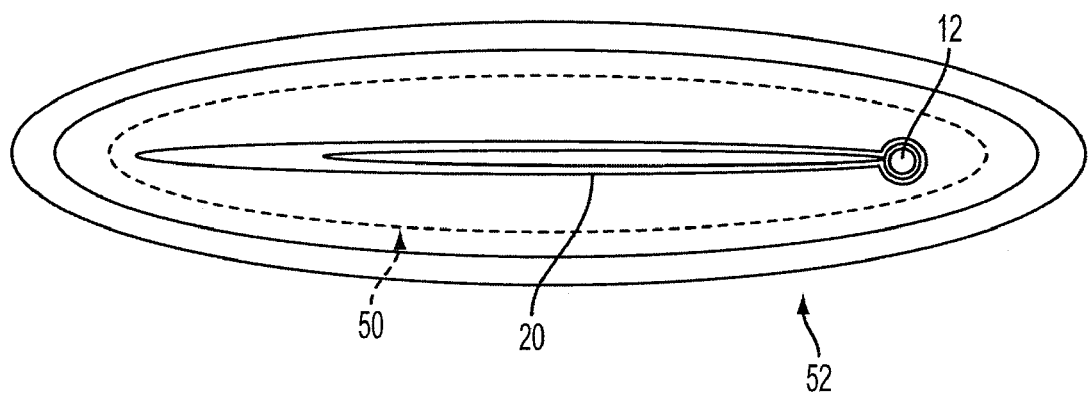
FIG. 6 is a schematic, cross-sectional view of FIG. 5, taken along lines VI-VI of FIG. 5.

Referring to FIGS. 5 and 6, an exemplary aircraft fuel system located with a portion of an aircraft wing 52 is shown. The fuel system may include a fuel container 50, which can comprise a flexible bladder (as shown), or alternatively, a rigid or semi-rigid container. According to an exemplary embodiment, the fuel container 50 may comprise a block 1A bladder without baffles, although other configurations are possible.

As shown in FIGS. 5 and 6, the fuel container 50 may be located within an aircraft wing 52, for example, in the hollow region formed between the leading and trailing edges 54, 56, and between ribs 58, 60, although other configurations and arrangements are possible. According to one exemplary embodiment, the size and shape of the fuel container 50 may be constrained only by the interior dimensions of the wing. For example, according to an exemplary embodiment, a flexible fuel bladder 50 can extend across nearly the entire span and chord of the wing 52.

The fuel container 50 can contain at least a portion of the fuel pickup tube 10, as well as the wicking material 20. The fuel bladder and/or the wicking material 20 may be in any of the exemplary configurations discussed herein.

In the exemplary embodiment of FIGS. 4 and 5, the fuel bladder and/or the wicking material 20 may be in a bag-like configuration, according to which embodiment, the bag 40 may define an outer perimeter 42 that is of substantially the same shape and dimensions as the outer perimeter 59 of the fuel container 50, thereby maximizing the area within the fuel container 50 that can be reliably used for fuel uptake. The latter may alternatively have the tabbed configurations shown in FIGS. 2 and 3, although, other configurations are also possible, as provided herein. Also, as shown in FIG. 5 the fuel container 50 may include an access hatch 51, to provide access to the fuel pickup tube 10 and/or wicking material 20 located inside the fuel container 50.

Figure 7:
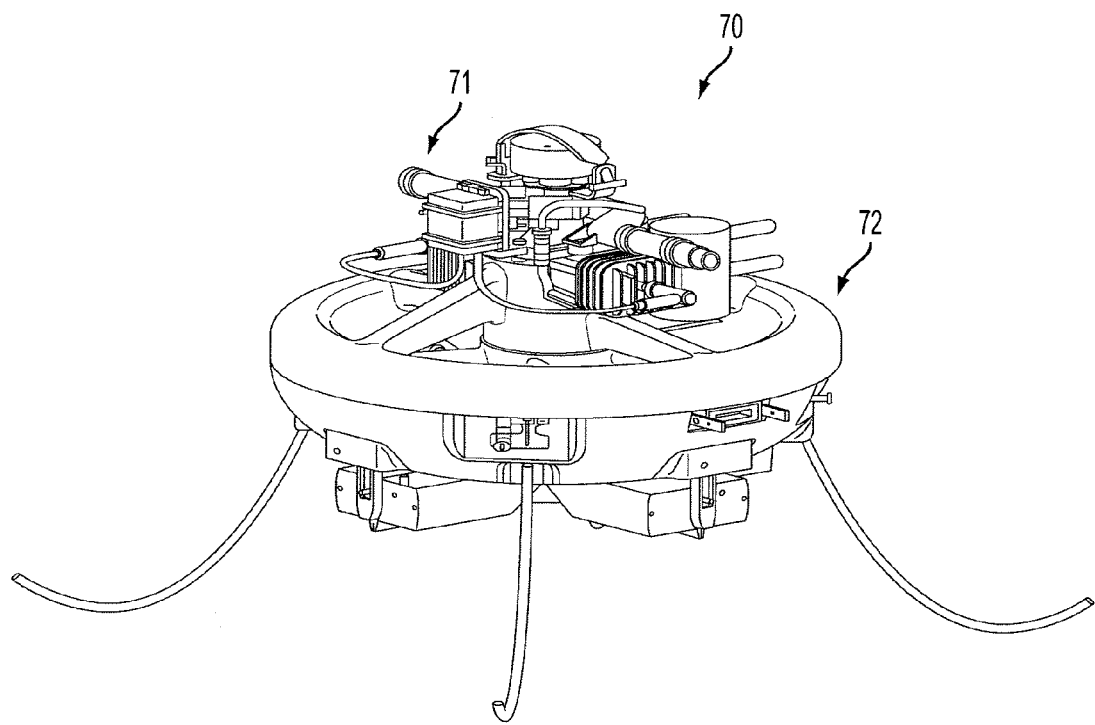
FIG. 7 illustrates an exemplary micro air vehicles (MAVs) in accordance with the present embodiments.

In a number of embodiments, the fuel bladder assemblies of the present embodiments may be provided in an MAV as noted. FIG. 7 illustrates an exemplary MAV. In the exemplary embodiment, the MAV 70 may comprise a Vertical takeoff and landing (VTOL) air vehicle (AV) that may be powered by a small two-stroke engine (unleaded gasoline/oil mix) driving a ducted fan. MAV 70 may include an exemplary engine component 71 and an exemplary fan duct assembly 72. The requirements for such a small AV may provide insights to design efficiency and vehicle balance crucial for operational success. Since the ducted fan must provide lift and use redirected lift to create omni-horizontal motion, a neutral center-of-gravity may be required to maintain stable AV flight control at all times. This need for neutral center-of-gravity may require a fuel reservoir that is located symmetrically on the MAV to maintain balance regardless of fuel level.

Figure 8:
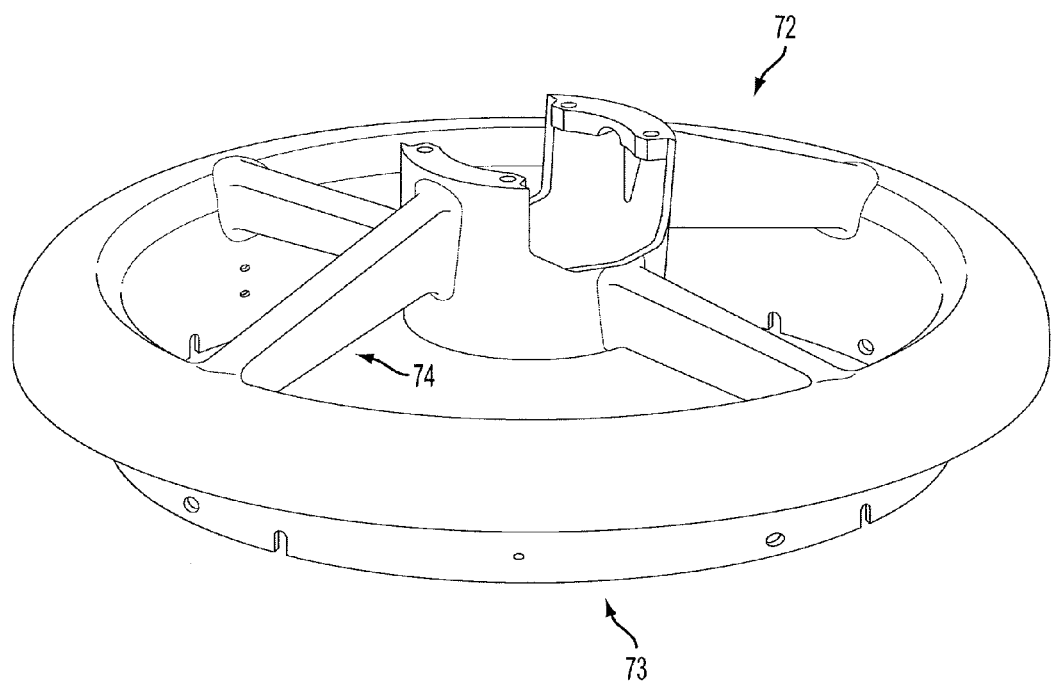
FIG. 8 illustrates an exemplary fan duct assembly which may house an exemplary fuel tank and/or fuel bladder.

FIG. 8 illustrates an exemplary fan duct assembly 72 which may house an exemplary fuel tank and/or fuel bladder. For example, in an exemplary embodiment, the fuel tank for the MAV may be a fuel bladder that is structurally supported when installed into the fan duct. The fan duct itself may comprise a complex structural geometry constructed of, for example, carbon fiber, to form a shell 73 supported by struts 74, within which the fuel supply is located. In an exemplary embodiment, the internal finish of the duct is as smooth as possible so that the fuel bladder is not slit or torn. In one exemplary embodiment, the bladder may be approximately 44 inches in length and 3 inches in height (collapsed and flattened).

In an exemplary embodiment, the fuel port may be located in the middle of the bladder with two piccolo tubes, one running to each end. When installed, the bladder may form a "C" shape and the piccolo tubes are located at the bottom of the fan duct shell. For example, in certain embodiments the tubing used may comprise an ester-based un-reinforced clear polyurethane.

Figure 9:
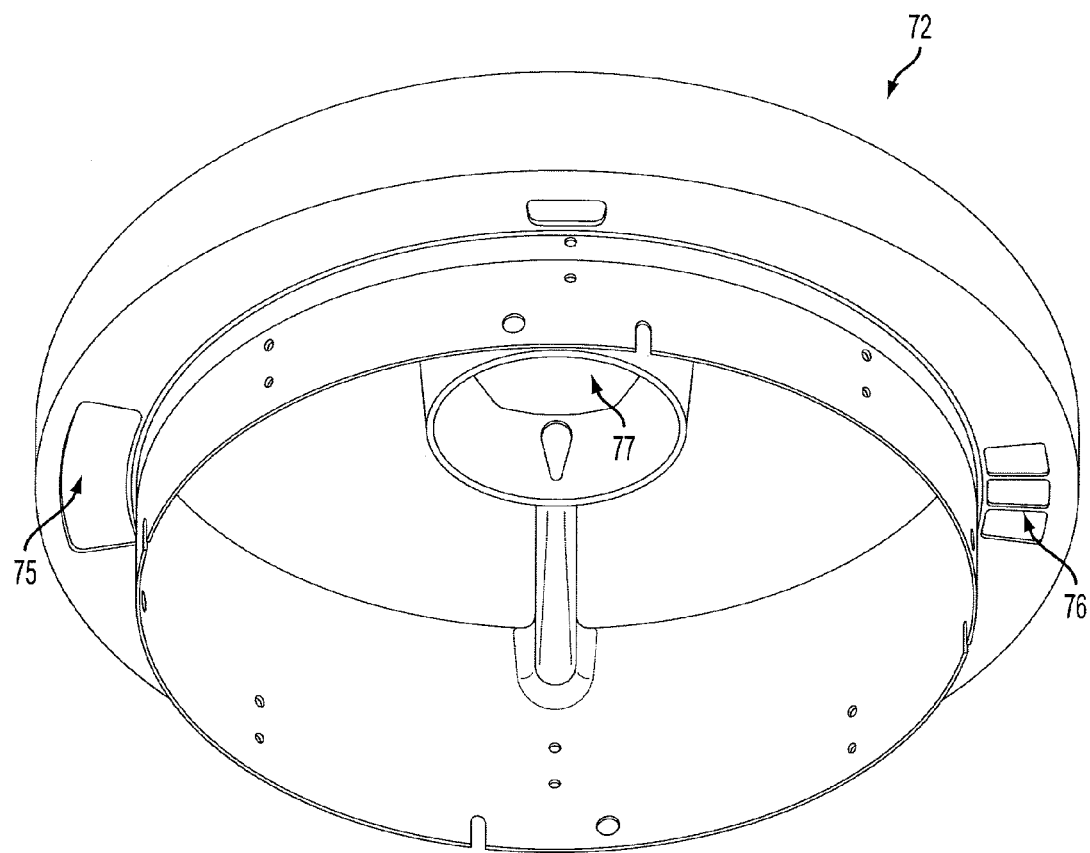
FIG. 9 illustrates the underside of the exemplary fan duct assembly of FIG. 9.

FIG. 9 illustrates the underside view of exemplary fan duct assembly 72 which may house an exemplary fuel tank and/or fuel bladder. The embodiment is illustrative of the fuel bladder installation. On the left side is a fuel bladder installation access opening 75, and on the right hand side is an access opening for a lacing cord 76. The fuel bladder may be installed into the duct through a relatively small access opening and may involve carefully "fishing" the two ends of the bladder into place. To start the process, the middle of the bladder may be installed first as the fuel feed line is passed through the strut 77 up to the engine area. Next, a lacing cord that is attached to loops at each end of the bladder may be passed internally at 76 around each half of the fan duct to the opposite access opening. Finally, each end of the fuel bladder may be pulled into place within the fan duct.

In an exemplary embodiment, the fuel bladder design may include as standard a bulkhead barb fitting at the center of the fuel tank for the manifold port type. The piccolo tubes may be attached at this location and extended toward each end of the fuel bladder. In exemplary embodiments, there is little or no gap between the end of the tube and the end of the fuel bladder. The entire lengths of the piccolo tubes may also be attached to the bottom of the bladder using a variation of bonding methods for reliable for use in most standard fuel tank applications.

In a number of exemplary embodiments, the MAV fuel bladder may include the result of several evolutional changes. In exemplary embodiments, to overcome a notable number of bladder failures associated with a kinking or bending of piccolo tubes, which cause of fuel stoppage, redesigns to eliminate the piccolo tube are provided. In these embodiments, additional problems associated with twisting or folding over of bladder ends may also be prevented or substantially reduced.

Figure 11:
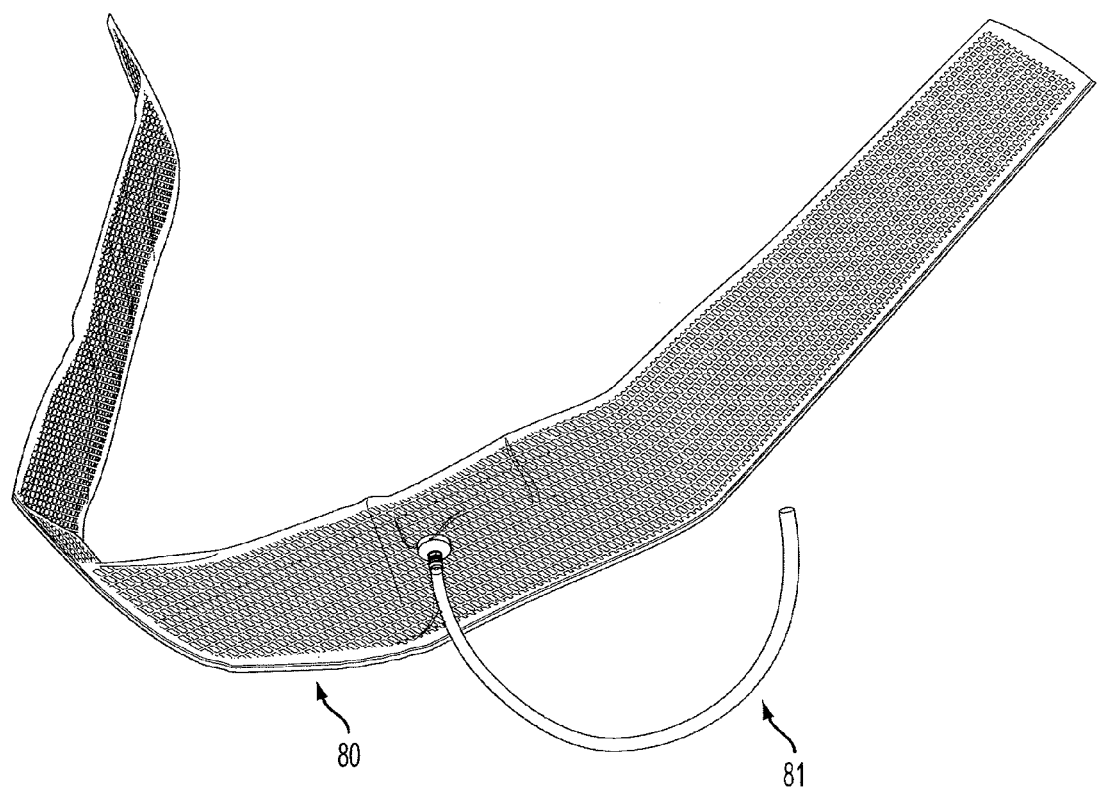
FIG. 11 depicts an exemplary first fuel bladder assembly in accordance with the present embodiments.

FIG. 11 provides a first set of exemplary embodiments for an improved fuel bladder design which eliminates piccolo tubing. This first set of embodiments may provide a bladder, such as for example a flexible fuel bladder 80. Fuel is dispensed from fuel bladder 80 to the engine intake manifold via flexible tube 81. In an exemplary embodiment, fuel bladder 80 is fabricated of a fuel-resistant polyurethane film, which may, for example, use a polyethylene plastic netting insert to create multiple flow paths, through which the fuel may be drawn from the bladder's most remote areas to the center outlet, until empty.

Figure 12:
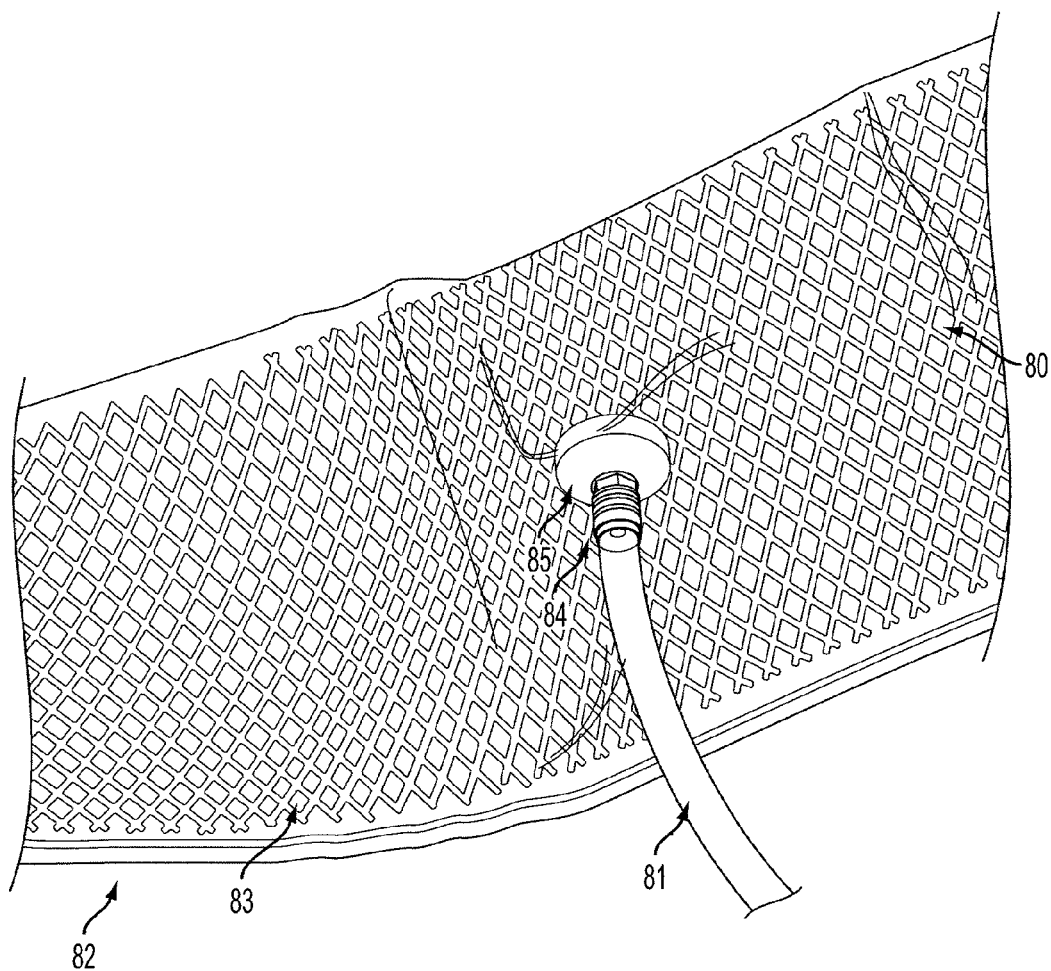
FIG. 12 depicts a more detailed illustration of the exemplary first fuel bladder assembly of FIG. 11.

FIG. 12 provides a more detailed illustration of the exemplary embodiment of FIG. 11. Fuel is drawn from fuel bladder 80 by flexible tube 81. In the illustrated embodiment, a multi-ported manifold includes o-ring 85 and washer and threaded barb fitting 84, which are respectively inserted into the middle of the fuel bladder 80 for fuel pickup. In an exemplary embodiment, the manifold assembly is not connected to the netting 83. The flexible tube 81 may be attached to the manifold 84, 85 to draw in fuel from inside fuel bladder 80.

As illustrated, fuel flow may be maintained from the furthest regions of the fuel bladder 80 by replacement of an exemplary urethane piccolo tube with a type of netting 83. In an exemplary embodiment, the netting 83 is comprised of a composite fabrication processing method, such as vacuum assisted resin transfer molding (VARTM). In this exemplary embodiment, a solvent-resistant, thermoplastic netting 83 is fabricated in a process similar to the installation of metal rebar, where strands are placed perpendicular to and on top of an initial set of lower parallel strands, to which they may be attached by heat. Through this process, flow passages may be created at each intersection.

In an exemplary embodiment, the netting 83 may be sandwiched between two solvent-resistant thermoplastic films comprising and heat sealed along the edges 82, creating an exemplary leak-proof fuel bladder 80. In an exemplary embodiment, as the fuel level decreases during evacuation, the bladder 80 will collapse until the sides make contact with the netting 83. At this time, flow will continue from the furthest regions through the passages created by the netting intersections, until all fuel is evacuated.

Figure 13:
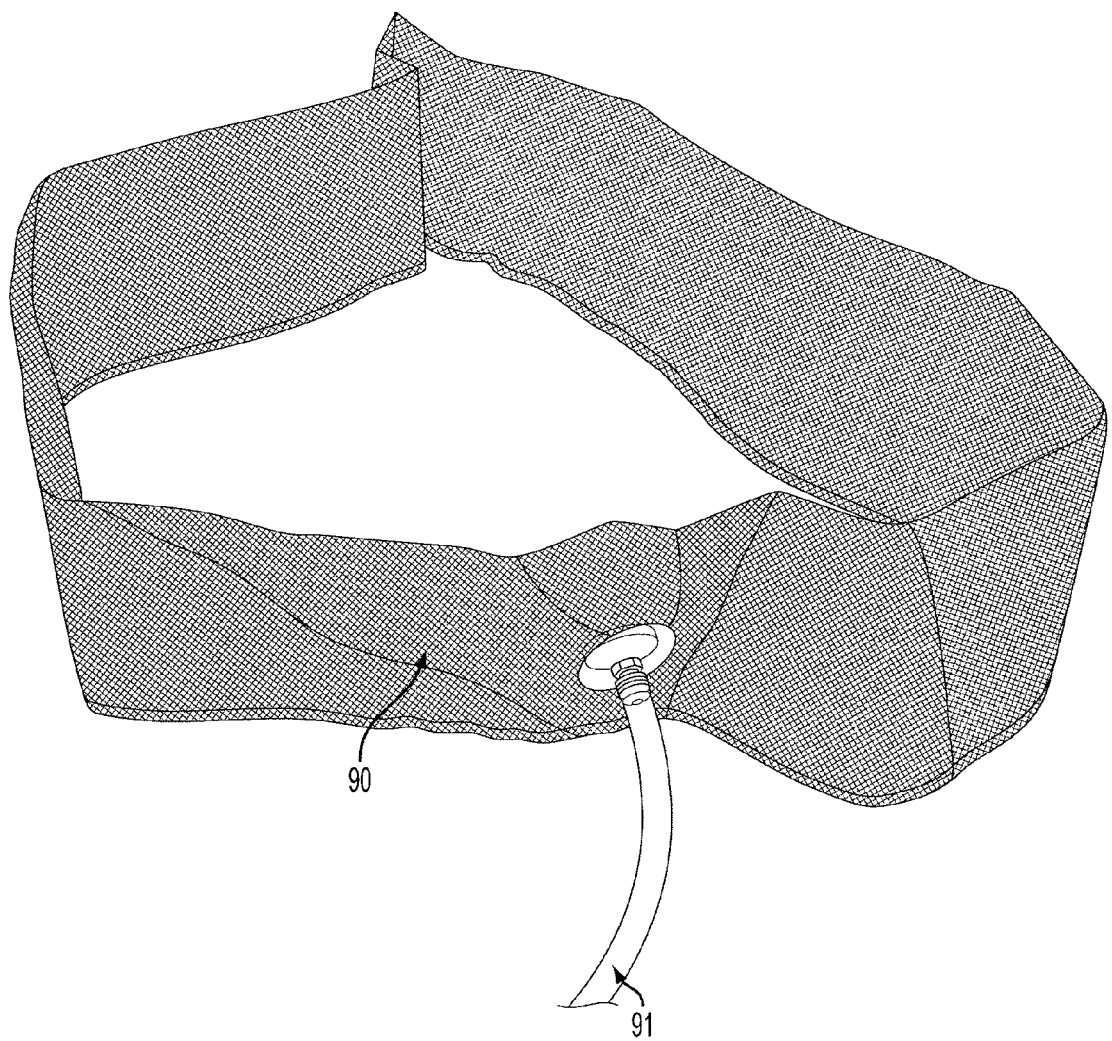
FIG. 13 depicts an exemplary second fuel bladder assembly in accordance with the present embodiments.

FIG. 13 provides a second set of exemplary embodiment for an improved fuel bladder design which eliminates piccolo tubing. This second set of embodiments may provide a bladder, such as for example a flexible fuel bladder 90. Fuel is dispensed from fuel bladder 90 to the engine intake manifold via flexible tube 91. In an exemplary embodiment, fuel bladder 90 is fabricated of a fuel-resistant embossed nylon film, which may, for example, collapse as fuel is evacuated therefrom. The embossed surface feature may create multiple flow paths, through which the fuel is drawn from the bladder's most remote areas to the center outlet, until empty.

Figure 14:
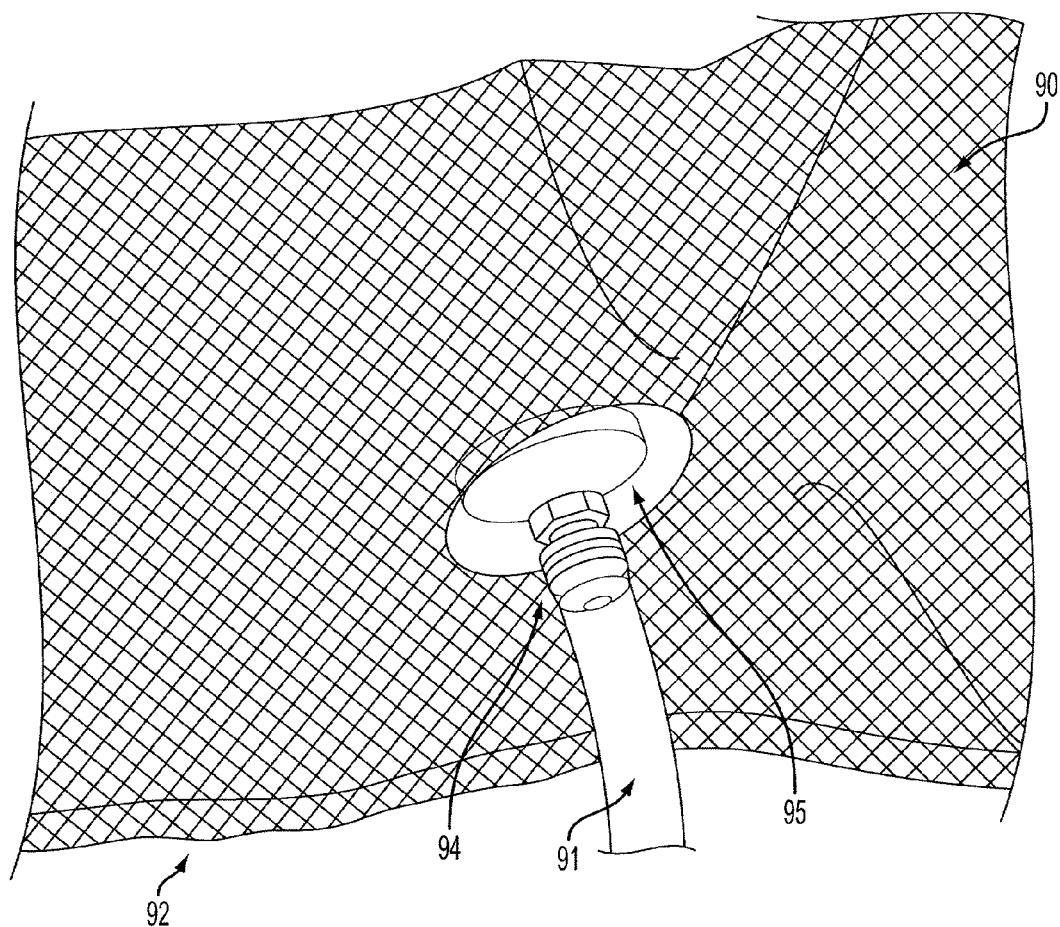
FIG. 14 depicts a more detailed illustration of the exemplary second fuel bladder assembly of FIG. 13.

FIG. 14 provides a more detailed illustration of the exemplary embodiment of FIG. 13. Fuel is drawn from fuel bladder 90 by flexible tube 91. In the illustrated embodiment, a multi-ported manifold includes o-ring 95 and washer and threaded barb fitting 94, which are respectively inserted into the middle of the fuel bladder 90 for fuel pickup. In an exemplary embodiment, the manifold assembly is not connected to the fuel bladder 90. The flexible tube 91 may attach to the manifold 94, 95 to draw in fuel from inside fuel bladder 80.

In an exemplary embodiment, fuel flow may be maintained from the furthest regions of the fuel bladder by using an embossed film to create fuel bladder 90. In an exemplary embodiment, thermoplastic, fuel-proof films may be embossed with a fine crisscross pattern to create flow passages, which will remain open even under vacuum. In an exemplary embodiment, this pattern may be similar to the embossed patterns used for food saver bags used by food vacuum bag systems.

In an exemplary embodiment, one or more embossed films are heat sealed along the edges 92, creating a leak-proof fuel bladder 90. As the fuel level decreases during evacuation, the bladder may collapse until the embossed surfaces make contact. At this time, flow will continue from the furthest regions through the passages created by the embossing, until all fuel is evacuated.

Figure 15:
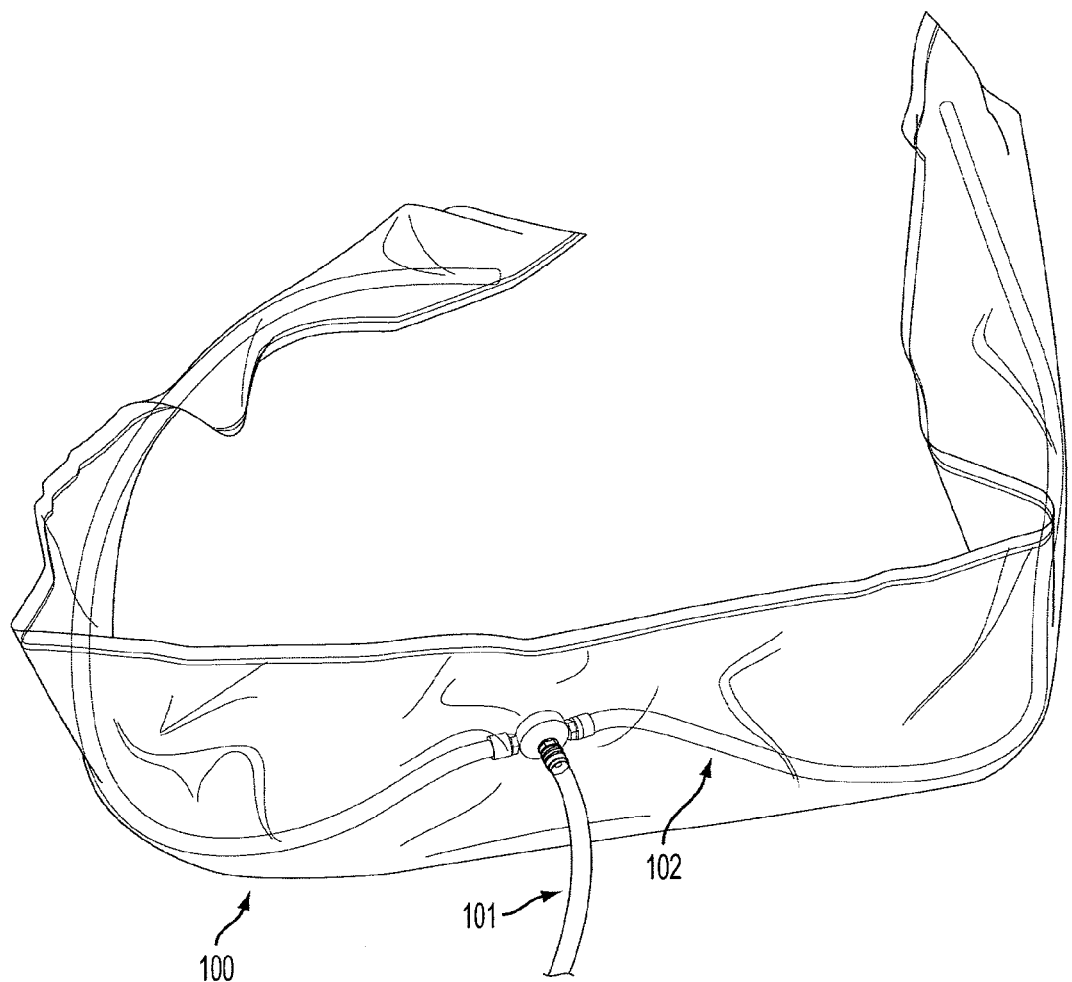
FIG. 15 depicts an exemplary third fuel bladder assembly in accordance with the present embodiments.

FIG. 15 provides a third set of exemplary embodiments for an improved fuel bladder design which eliminates piccolo tubing. This third set of embodiments may provide a bladder, such as for example a flexible fuel bladder 100. Fuel is dispensed from fuel bladder 100 to the engine intake manifold via flexible tube 101. In an exemplary embodiment, fuel bladder 100 is fabricated of a fuel-resistant polyurethane film, having a spiral wrap tube 102 attached to the center outlet, extending the full length of the bladder. In an exemplary embodiment, the spiral tube 102 may be comprised of a plastic material. In an exemplary embodiment, the spiral tube 102 may be comprised of a Teflon® or similar material. As the bladder collapses, the tube's spiral cut may act as a continuous inlet while the tube itself creates a flow path to the outlet. In an exemplary embodiment, the tube material comprises a kink-resistant and fuel proof material.

Figure 16:
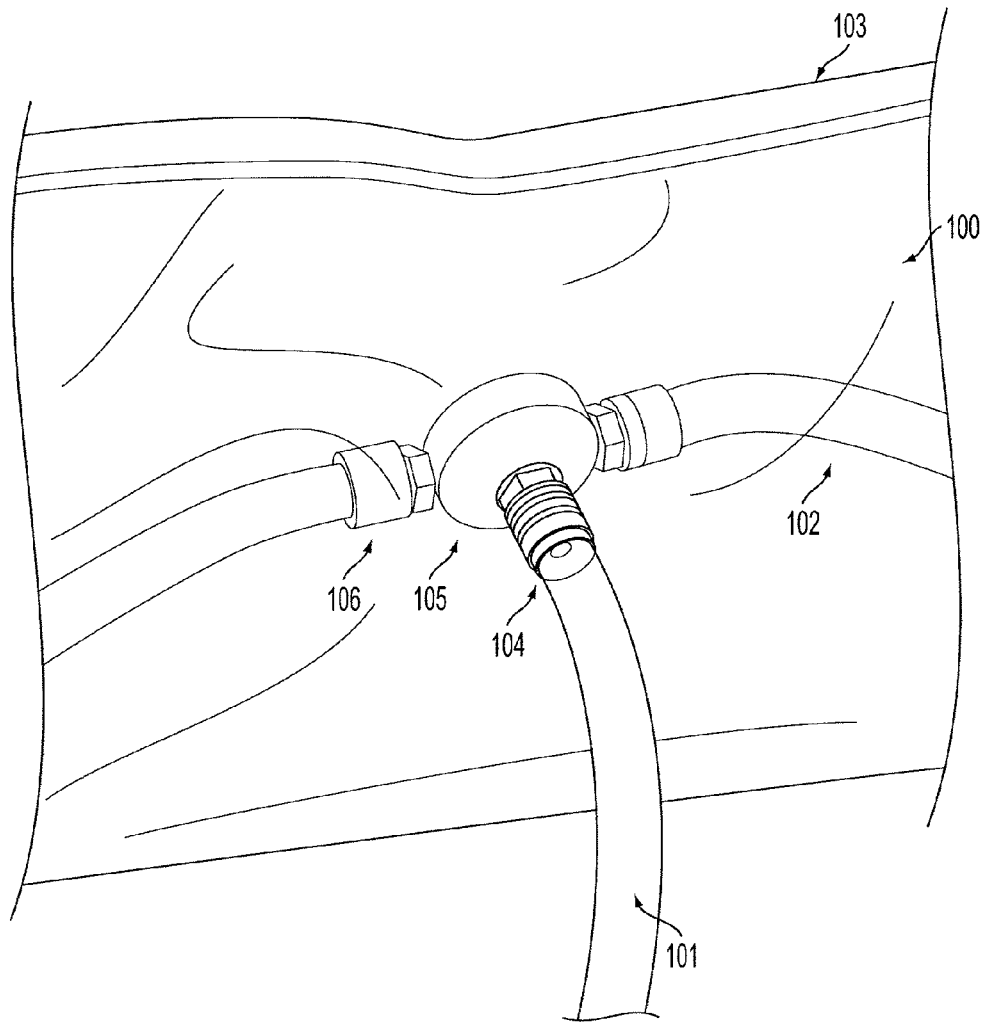
FIG. 16 depicts a more detailed illustration of the exemplary third fuel bladder assembly of FIG. 15.

FIG. 16 provides a more detailed illustration of the exemplary embodiment of FIG. 15. Fuel is drawn from fuel bladder 100 by flexible tube 101. In the illustrated embodiment, a multi-ported manifold includes o-ring 105 and washer and threaded barb fitting 104, 106, which are respectively inserted into the middle of the fuel bladder 100 for fuel pickup. In an exemplary embodiment, the manifold assembly is not connected to the fuel bladder 100. The flexible tube 101 may attach to the manifold 104, 105 to draw in fuel from inside fuel bladder 100.

In an exemplary embodiment, fuel flow may be maintained from the furthest regions of the fuel bladder 100 by using an exemplary fuel-proof spiral wrap tube 102, typically used to wrap electrical wire bundles, in place of the aforementioned piccolo tube. In an exemplary embodiment, the thermoplastic spiral wrap tube 102 can withstand repeated vacuum cycles without collapsing or kinking. In an exemplary embodiment, since the spiral cut may be continuous, there is more flow path area and the wrap does not need to have flow holes punched in a secondary process.

In an exemplary embodiment, two solvent resistant, thermoplastic films are heat sealed at the edges 103, creating a leak-proof bladder. In an exemplary embodiment, two lengths of the spiral wrap tube 102 are attached to the centered manifold 104-106 and extend to each end of the fuel bladder 100. As the fuel level decreases during evacuation, the bladder may collapse until the surfaces make contact with the tube 102. The fuel may continue to flow from the furthest regions through the tube 102, until all fuel is evacuated.

Figure 10:
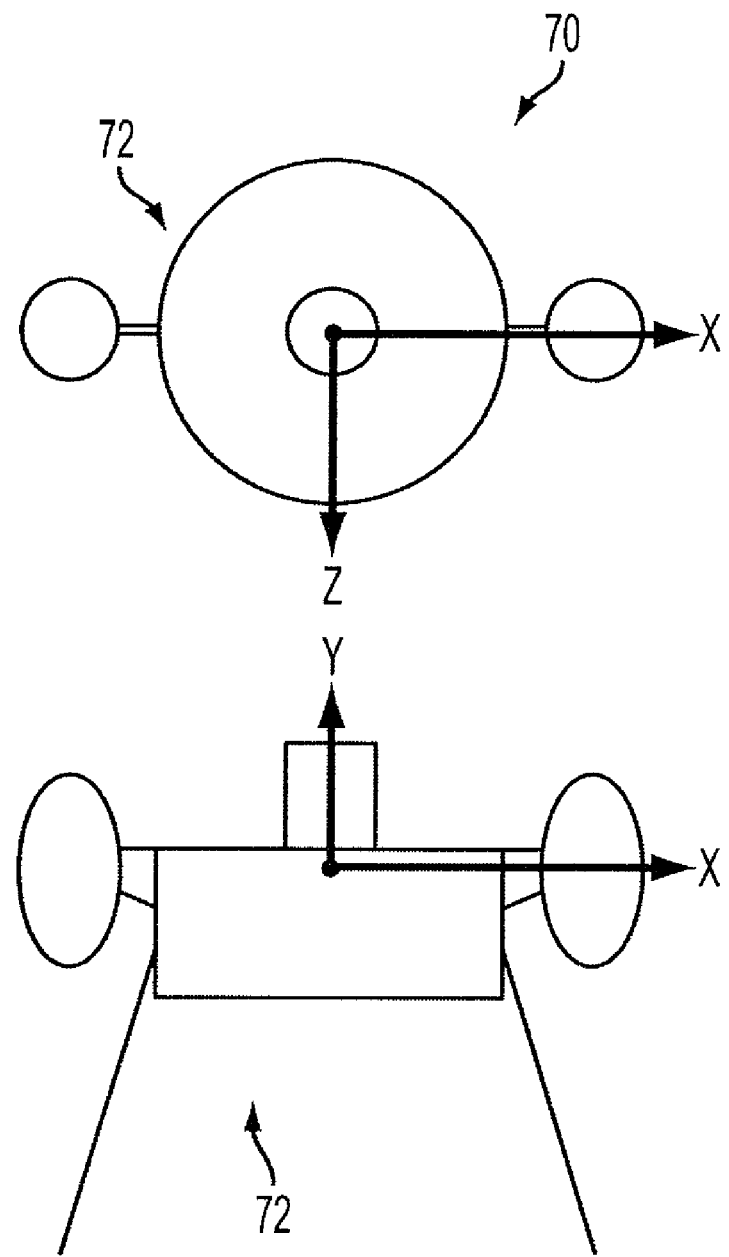
FIG. 10 provides an exemplary schematic illustration of the MAV fuel bladder assembly.

FIG. 10 provides a schematic view of MAV 70, including fan duct assembly 72, illustrative of the axes of orientation of the vehicle. The embodiment is useful for unusable fuel remaining in static and dynamic orientation angles, in reference to the above fuel bladder embodiments.

In a first exemplary embodiment of Table 1, the objective was to determine the amount of unusable fuel remains at different static vehicle orientation angles. For the purposes of these tests, the axes were used in the following procedure:

1. Fuel the tank using a fueling procedure.
2. Connect the fuel tank to a fuel pump and valve assembly calibrated to remove 1.3 liters per hour.
3. Position the fuel tank at 0° about the X-axis and Z-axis.
4. Run the fuel pump until vapor bubbles appear in the fuel line. Record the volume of fuel removed from the bladder.
5. Repeat the test with the tank rotated 0° about the X-axis and 20° about the Z-axis.
6. Repeat the test with the tank rotated 0° about the Z-axis and 30° about the X-axis with the side of the tank where the fuel line exits down.
7. Repeat the test with the tank rotated 0° about the Z-axis and 20° about the X-axis with the side of the tank where the fuel line exits up.

The results of the remaining fuel at static angles are provided in Table 1 below.

TABLE 1

| | Remaining Fuel at Static/Angles | | | |
|---|---|---|---|---|
| | Fuel Remaining | | | |
| Bladder Configuration | 0° about the X-axis and Z-axis | 0° about the X-axis and 20° about the Z-axis | 0° about the Z-axis and 30° about the X-axis, fuel line down | 0° about the Z-axis and 20° about the X-axis, fuel line up |
| Embossed | 20 ml | 40 ml | 10 ml | 20 ml |
| Netting | 20 ml | 10 ml | 10 ml | 20 ml |
| Tubing | 20 ml | 20 ml | 30 ml | 50 ml |

In the exemplary embodiment of Table 2, the objective was to determine the amount of unusable fuel remaining at different dynamic vehicle orientation angles. The procedure was as follows:

1. Fuel the tank.
2. Connect the fuel tank to the engine.
3. Position the fuel tank at 20° about the X-axis or Z-axis.
4. Start the engine.
5. Rotate the tank about the Y-axis continuously at a rate of approximately 0.1 Hz.
6. Continue the test until the engine stops due to lack of fuel.
7. De-fuel the tank into a graduated cylinder and record the amount of fuel that is left in the tank after the engine run.

TABLE 2

| Remaining Fuel at Dynamic/Angle | |
|---|---|
| Bladder Configuration | Fuel Remaining 20° about the X-axis and Z-axis |
| Embossed | Nil |
| Netting | Typical |
| Tubing | Typical |

Table 3 provides exemplary fuel bladder weights used in experimentation. In experimentation, each bladder was inspected to ensure that the external fuel line was the same length. Each bladder was weighted including its respective external fuel line.

TABLE 3

| Bladder Weights | | |
|---|---|---|
| Configuration | Weight | Tube Length |
| Embossed Film | 1.1 oz | 10.5" |
| Netting Insert | 1.9 oz | 10.5" |
| Spiral Tubing | 3.0 oz | 10.5" |

In the exemplary embodiments of Tables 4 and 5, volume and time to fuel/de-fuel were tested in both clear and production test ducts. Each bladder type was installed into a test duct. All air was evacuated from the fuel bladder. Using test fluid, the tank was filled until pressure inside the tank reached 3 PSI. Time to fill the bladder and fill volume was recorded. Condition of the fuel tank as it fills all of the available volume within the leading edge was noted.

The tank was de-fueled into a graduated container. The amount of fuel removed from the tank and the time it took to de-fuel was recorded. De-fueling and fueling was repeated and times and volumes were recorded.

TABLE 4

| Carbon Production Duct | | | | | |
|---|---|---|---|---|---|
| Bladder Configuration | Time to De-fuel | Time to Fuel | Fill Volume | Tube Position | Bag Wrinkles |
| Test 1 | | | | | |
| Embossed | 2:45 | 2:50 | 1190 ml | na | na |
| Netting | 2:45 | 2:52 | 1250 ml | na | na |
| Tubing | 3:33 | 3:28 | 1300 ml | na | na |

TABLE 4-continued

Carbon Production Duct

| Bladder Configuration | Time to De-fuel | Time to Fuel | Fill Volume | Tube Position | Bag Wrinkles |
|---|---|---|---|---|---|
| Test 2 | | | | | |
| Embossed | 2:48 | 2:52 | 1205 ml | na | na |
| Netting | 2:48 | 2:55 | 1250 ml | na | na |
| Tubing | 3:35 | 3:30 | 1300 ml | na | na |

TABLE 5

Clear Test Duct

| Bladder Configuration | Time to De-fuel | Time to Fuel | Fill Volume | Tube Position | Bag Wrinkles |
|---|---|---|---|---|---|
| Test 1 | | | | | |
| Embossed | 2:55 | 3:07 | 1365 ml | na | Yes |
| Netting | 3:04 | 3:15 | 1425 ml | na | Yes |
| Tubing | 3:10 | 3:28 | 1410 ml | na | Yes |
| Test 2 | | | | | |
| Embossed | 2:58 | 3:06 | 1370 ml | na | Yes |
| Netting | 3:05 | 3:17 | 1425 ml | na | Yes |
| Tubing | 3:11 | 3:20 | 1410 ml | na | Yes |

In the exemplary embodiments of Tables 6 and 7, the fuel bladders were installed into a production MAV duct with heating system for temperature testing. Covers were fixed over the duct openings. At ambient temperature, the bladders were filled with recommended volume of non-explosive calibration fluid (1.35 liters) using a fill procedure. This was changed to the automated fueler in later tests. Temperature was increased to the maximum storage temperature (120 F). Pressure increase vs. increase in temperature were measured and recorded. A dwell time of 2 hours at elevated temperature was applied to represent stabilization at an extended storage period. Total elapsed time and pressure at test temperature was measured and recorded. Effects to bladder and duct structure were noted.

A repeat of this test, with the fuel bladder filled to its maximum volume of fuel (determined by reaching a pressure of 3 PSI), was performed to determine the effects of pressure under the severest of conditions possible. These could occur if the user miscalculates the volume or the fueling equipment malfunctions, resulting in fuel volume in excessive of 1.35 liters.

TABLE 6

Elevated Temperature Results to 120 F.

| Embossed/Nylon 1300 ml max volume | | | Netting/Polyurethane 1270 ml max volume | | | Tubing/Polyurethane 1350 ml max volume | | |
|---|---|---|---|---|---|---|---|---|
| Time | Temp | Pressure | Time | Temp | Pressure | Time | Temp | Pressure |
| 0 | 76 | 1.9 | 0 | 73 | 1.5 | 0 | 76 | 1.5 |
| 15 | 120 | 2.9 | 15 | 120 | 2.9 | 15 | 120 | 5.8 |
| 30 | 125 | 3.0 | 30 | 121 | 2.9 | 30 | 121 | 5.5 |
| 45 | 123 | 2.9 | 45 | 123 | 2.7 | 45 | 122 | 5.5 |
| 60 | 121 | 2.5 | 60 | 123 | 1.8 | 60 | 122 | 4.5 |
| 75 | 122 | 2.5 | 75 | 122 | 1.7 | 75 | 123 | 4.5 |
| 90 | 124 | 2.4 | 90 | 121 | 1.6 | 90 | 120 | 3.5 |
| 120 | 124 | 2.4 | 120 | 122 | 1.6 | 120 | 120 | 3.3 |

TABLE 7

Elevated Temperature Results to 180 F.

| Embossed/Nylon 1340 ml max volume | | | Netting/Polyurethane 1300 ml max volume | | | Tubing/Polyurethane 1350 ml max volume | | |
|---|---|---|---|---|---|---|---|---|
| Time | Temp | Pressure | Time | Temp | Pressure | Time | Temp | Pressure |
| 0 | 71 | 1.0 | 0 | 73 | 1.0 | na | na | na |
| 15 | 118 | 2.8 | 15 | 120 | 1.5 | | | |
| 30 | 129 | 2.6 | 30 | 121 | 1.5 | | | |
| 45 | 152 | 5.3 | 45 | 150 | 1.5 | | | |
| 60 | 155 | 4.6 | 60 | 151 | 1.2 | | | |
| 75 | 180 | 7.8 | 75 | 181 | 3.3 | | | |
| 90 | 182 | 6.0 | 90 | 179 | 2.0 | | | |
| 105 | 181 | 5.8 | 105 | 179 | 1.6 | | | |
| 120 | 179 | 4.4 | 120 | 180 | 1.6 | | | |

In the exemplary embodiment of Table 8, bladder burst temperature was measured. The fan duct is constructed of carbon fiber to form a rigid shell within which the fuel tank is contained. The MAV fuel tank is a flexible bladder, supported by the fan duct structure when installed and fueled. The bladder may burst if fuel in a full bladder is exposed to elevated temperature, if the user miscalculates the volume and overfills, or if the fueling equipment malfunctions and overfills. Any unsupported surface of the bladder, possibly located around the main strut opening, lower inside and outside corners, or in areas where the bladder has twisted, will be stretched by the pressure. The polyurethane bladder material will become thinner as it is stretched and, at some point, will burst. The purpose of testing was to define the limit to which the bladder could be pressurized before it would burst. Assets required for testing include fuel bladders, MAV duct structure, pressure pump, heated test chamber, and pressure gauge. Each fuel bladder was installed into the duct without bladder covers over one of the duct openings. At a test temperature of 100 F, the bladder was gradually pressurized in 1 PSI increments with test fluid until it fails at one of the openings. Each pressure increment was held for 5 minutes before proceeding to the next increase in pressure. Pressure at failure was to be measured and recorded. Effects to bladder and duct structure were noted. This required removal of the bladder and inspection for stretched areas that did not burst.

TABLE 8

Burst Pressure

| Bladder Configuration | Burst Pressure at 100 F. | Effects to Bladder/Duct |
|---|---|---|
| Embossed | >15.25 PSI | None |
| Netting | >15.25 PSI | None |
| Tubing | >15.25 PSI | None |

Exemplary Processing and Communications Embodiments

Figure 17:
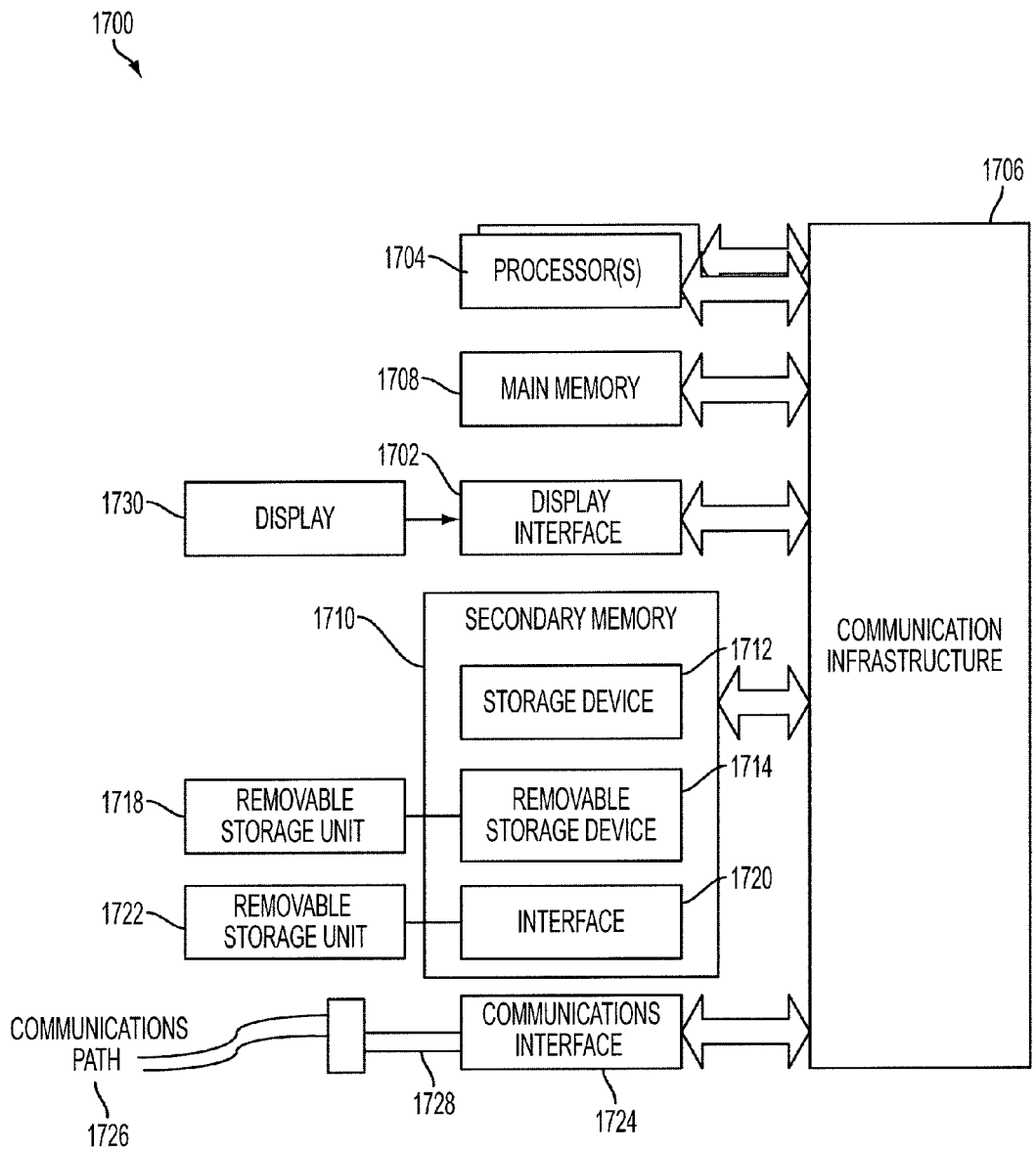
FIG. 17 depicts an exemplary embodiment of a computer system that may be used in association with, in connection with, and/or in place of certain components in accordance with the present embodiments.

FIG. 17 depicts an exemplary embodiment of a computer system 1700 that may be used in association with, in connection with, and/or in place of, but not limited to, any of the foregoing components and/or systems.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1700 is shown in FIG. 17, depicting an exemplary embodiment of a block diagram of an exemplary computer system useful for implementing the present invention. Specifically, FIG. 17 illustrates an example computer 1700, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1700 is shown in FIG. 17. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 17.

The computer system 1700 may include one or more processors, such as, e.g., but not limited to, processor(s) 1704. The processor(s) 1704 may be connected to a communication infrastructure 1706 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1700 may include a display interface 1702 that may forward, e.g., but not limited to, graphics, text, and other data, etc., from the communication infrastructure 1706 (or from a frame buffer, etc., not shown) for display on the display unit 1730.

The computer system 1700 may also include, e.g., but may not be limited to, a main memory 1708, random access memory (RAM), and a secondary memory 1710, etc. The secondary memory 1710 may include, for example, (but not limited to) a hard disk drive 1712 and/or a removable storage drive 1714, representing a floppy diskette drive, a magnetic tape drive, an optical disk drive, a compact disk drive CD-ROM, etc. The removable storage drive 1714 may, e.g., but not limited to, read from and/or write to a removable storage unit 1718 in a well known manner. Removable storage unit 1718, also called a program storage device or a computer program product, may represent, e.g., but not limited to, a floppy disk, magnetic tape, optical disk, compact disk, etc. which may be read from and written to by removable storage drive 1714. As will be appreciated, the removable storage unit 1718 may include a computer usable storage medium having stored therein computer software and/or data.

In alternative exemplary embodiments, secondary memory 1710 may include other similar devices for allowing computer programs or other instructions to be loaded into computer system 1700. Such devices may include, for example, a removable storage unit 1722 and an interface 1720. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1722 and interfaces 1720, which may allow software and data to be transferred from the removable storage unit 1722 to computer system 1700.

Computer 1700 may also include an input device such as, e.g., (but not limited to) a mouse or other pointing device such as a digitizer, and a keyboard or other data entry device (none of which are labeled).

Computer 1700 may also include output devices, such as, e.g., (but not limited to) display 1730, and display interface 1702. Computer 1700 may include input/output (I/O) devices such as, e.g., (but not limited to) communications interface 1724, cable 1728 and communications path 1726, etc. These devices may include, e.g., but not limited to, a network interface card, and modems (neither are labeled). Communications interface 1724 may allow software and data to be transferred between computer system 1700 and external devices. Examples of communications interface 1724 may include, e.g., but may not be limited to, a modem, a network interface (such as, e.g., an Ethernet card), a communications port, a Personal Computer Memory Card International Association (PCMCIA) slot and card, etc. Software and data transferred via communications interface 1724 may be in the form of signals 1728 which may be electronic, electromagnetic, optical or other signals capable of being received by communications interface 1724. These signals 1728 may be provided to communications interface 1724 via, e.g., but not limited to, a communications path 1726 (e.g., but not limited to, a channel). This channel 1726 may carry signals 1728, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1714, a hard disk installed in hard disk drive 1712, and signals 1728, etc. These computer program products may provide software to computer system 1700. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 1708 and/or the secondary memory 1710 and/or removable storage units 1714, also called computer program products. Such computer programs, when executed, may enable the computer system 1700 to perform the features of the present invention as discussed herein. In particular, the computer programs, when executed, may enable the processor 1704 to provide a method to resolve conflicts during data synchronization according to an exemplary embodiment of the present invention. Accordingly, such computer programs may represent controllers of the computer system 1700.

In another exemplary embodiment, the invention may be directed to a computer program product comprising a computer readable medium having control logic (computer software) stored therein. The control logic, when executed by the processor 1704, may cause the processor 1704 to perform the functions of the invention as described herein. In another exemplary embodiment where the invention may be implemented using software, the software may be stored in a computer program product and loaded into computer system 1700 using, e.g., but not limited to, removable storage drive 1714, hard drive 1712 or communications interface 1724, etc. The control logic (software), when executed by the processor 1704, may cause the processor 1704 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11a, b, d and g, (including, e.g., but not limited to IEEE 802.11g-2003, etc.), etc.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A flexible fuel bladder assembly disposed to store fuel and supply the fuel to a vehicle, the flexible fuel bladder assembly comprising:
   a fuel bladder comprising a fuel-resistant film disposed to store the fuel and supply the fuel therefrom at a manifold assembly connected thereto; and
   a netting comprising a first set of thermoplastic strands placed perpendicular to and on top of a second set of thermoplastic strands, wherein the netting is disposed within the fuel bladder and disposed to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

2. The flexible fuel bladder assembly of claim 1, wherein the vehicle comprises an unmanned aerial vehicle (UAV).

3. The flexible fuel bladder assembly of claim 1, wherein the unmanned aerial vehicle (UAV) comprises any one of: an organic air vehicle (OAV), a micro air vehicle (MAV), an unmanned ground vehicle (UGV) or an unmanned combat air vehicle (UCAV).

4. The flexible fuel bladder assembly of claim 1, wherein the fuel bladder is comprised of a flexible material.

5. The flexible fuel bladder assembly of claim 4, wherein the fuel bladder comprises a thermoplastic film.

6. The flexible fuel bladder assembly of claim 5, wherein the thermoplastic film has been heat sealed along at least one of its edges to enclose the fuel bladder.

7. The flexible fuel bladder assembly of claim 1, wherein at least a portion of the manifold assembly is disposed within the fuel bladder.

8. The flexible fuel bladder assembly of claim 7, wherein the manifold assembly comprises any one of: an o-ring; and a washer and threaded barb fitting.

9. The flexible fuel bladder assembly of claim 7, further comprising a flexible tube fixedly connected to the manifold assembly.

10. The flexible fuel bladder assembly of claim 9, wherein the flexible tube supplies fuel from the fuel bladder to the manifold assembly comprising an intake manifold of an engine of the vehicle.

11. The flexible fuel bladder assembly of claim 1, wherein the thermoplastic strands are comprised of a resin material.

12. The flexible fuel bladder assembly of claim 11, wherein the resin material is generated by a vacuum assisted resin transfer molting (VARTM) method.

13. An unmanned aerial vehicle (UAV), comprising:
an engine component;
a fan duct assembly comprising a shell structure disposed to hold a flexible fuel bladder assembly and one or more struts,
the flexible fuel bladder assembly being disposed to store fuel and supply the fuel to the engine component, the flexible fuel bladder assembly comprising:
   a fuel bladder comprising a fuel-resistant film disposed to store the fuel and supply the fuel therefrom at a manifold assembly of the engine component connected thereto; and
   a netting comprising a first set of thermoplastic strands placed perpendicular to and on top of a second set of thermoplastic strands, wherein the netting is disposed within the fuel bladder and disposed to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

14. The unmanned aerial vehicle (UAV) of claim 13, wherein the unmanned aerial vehicle (UAV) comprises a micro air vehicle (MAV).

15. The unmanned aerial vehicle (UAV) of claim 13, wherein the unmanned aerial vehicle (UAV) comprises any one of: an organic air vehicle (OAV), an unmanned ground vehicle (UGV) or an unmanned combat air vehicle (UCAV).

16. The unmanned aerial vehicle (UAV) of claim 13, wherein the fuel bladder comprises a thermoplastic film.

17. The unmanned aerial vehicle (UAV) of claim 16, wherein the thermoplastic film has been heat sealed along at least one of its edges to enclose the fuel bladder.

18. The unmanned aerial vehicle (UAV) of claim 13, wherein the manifold assembly comprises any one of: an o-ring; and a washer and threaded barb fitting.

19. The unmanned aerial vehicle (UAV) of claim 13, wherein the thermoplastic strands are comprised of a resin material.

20. A method of producing a flexible fuel bladder assembly disposed to store fuel and supply the fuel to a vehicle, the method of producing comprising:
   producing a fuel bladder from a fuel-resistant film to store the fuel and supply the fuel therefrom at a manifold assembly connected thereto;
   producing a netting comprising a first set of thermoplastic strands placed perpendicular to and on top of a second set of thermoplastic strands; and
   disposing the netting within the fuel bladder to prevent collapsing of any two or more sides of the fuel bladder upon each other and permit a substantial portion of the fuel to be supplied from the fuel bladder to the manifold assembly in an uninterrupted fashion until the substantial portion of fuel is removed from the fuel bladder.

21. The flexible fuel bladder assembly of claim 1, wherein a plurality of fuel flow passages are created at each intersection of the first set of thermoplastic strands and the second set of thermoplastic strands.

22. The flexible fuel bladder assembly of claim 1, wherein the netting is not connected to the manifold.

* * * * *